(No Model.)  4 Sheets—Sheet 1.
E. M. BENTLEY.
ELECTRIC RAILWAY.
No. 306,315. Patented Oct. 7, 1884.
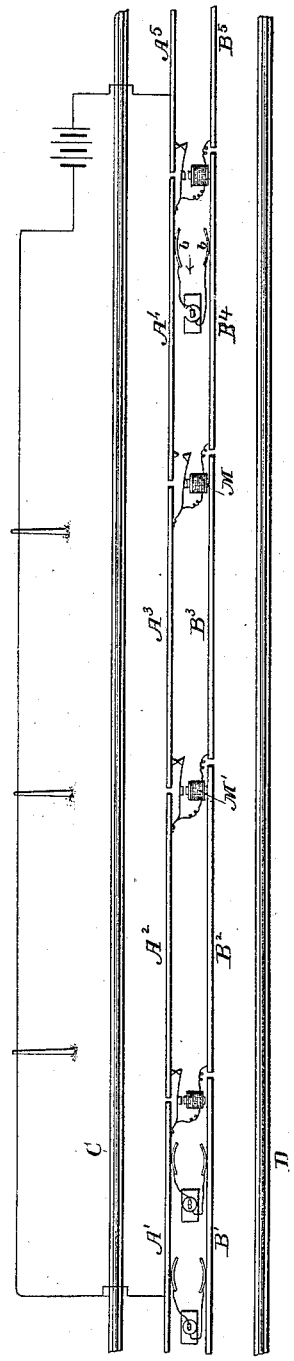
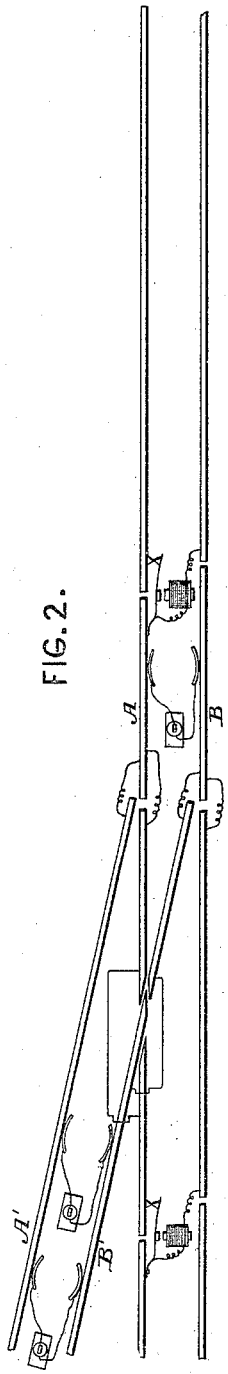
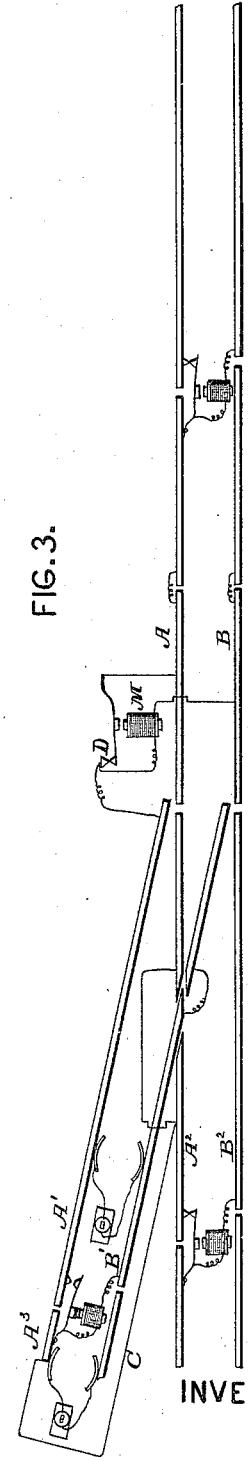
ATTEST.
J. Henry Kaiser.
Geo. T. Smallwood.
INVENTOR.
Edward M. Bentley (No Model.) 4 Sheets—Sheet 2.
E. M. BENTLEY.
ELECTRIC RAILWAY.
No. 306,315. Patented Oct. 7, 1884.
FIG. 4.
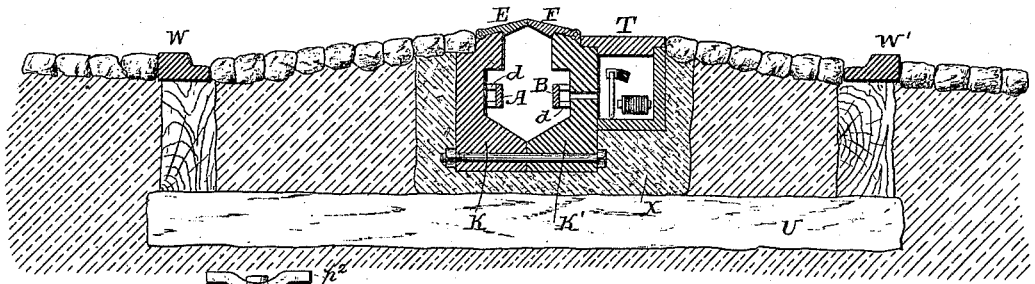
FIG. 5.
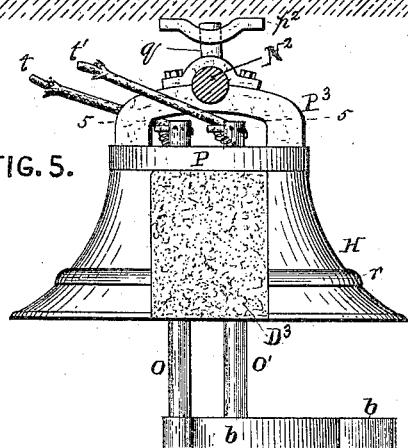
FIG. 6.
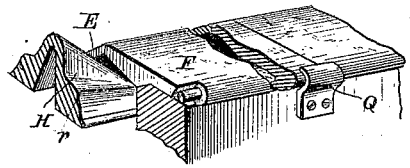
FIG. 18.
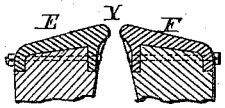
FIG. 7.
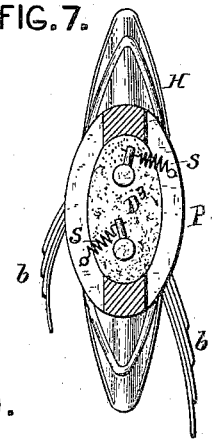
FIG. 8.
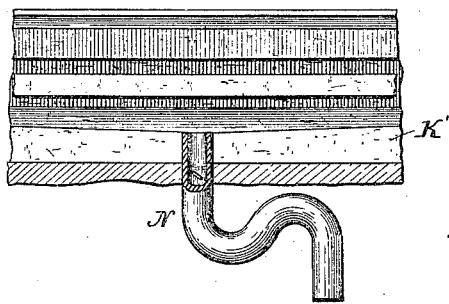
FIG. 9.
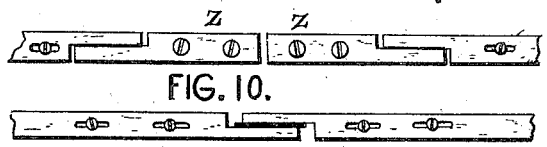
FIG. 10.
ATTEST.
J. Henry Kaiser.
Geo. T. Smallwood.
INVENTOR.
Edward M. Bentley.

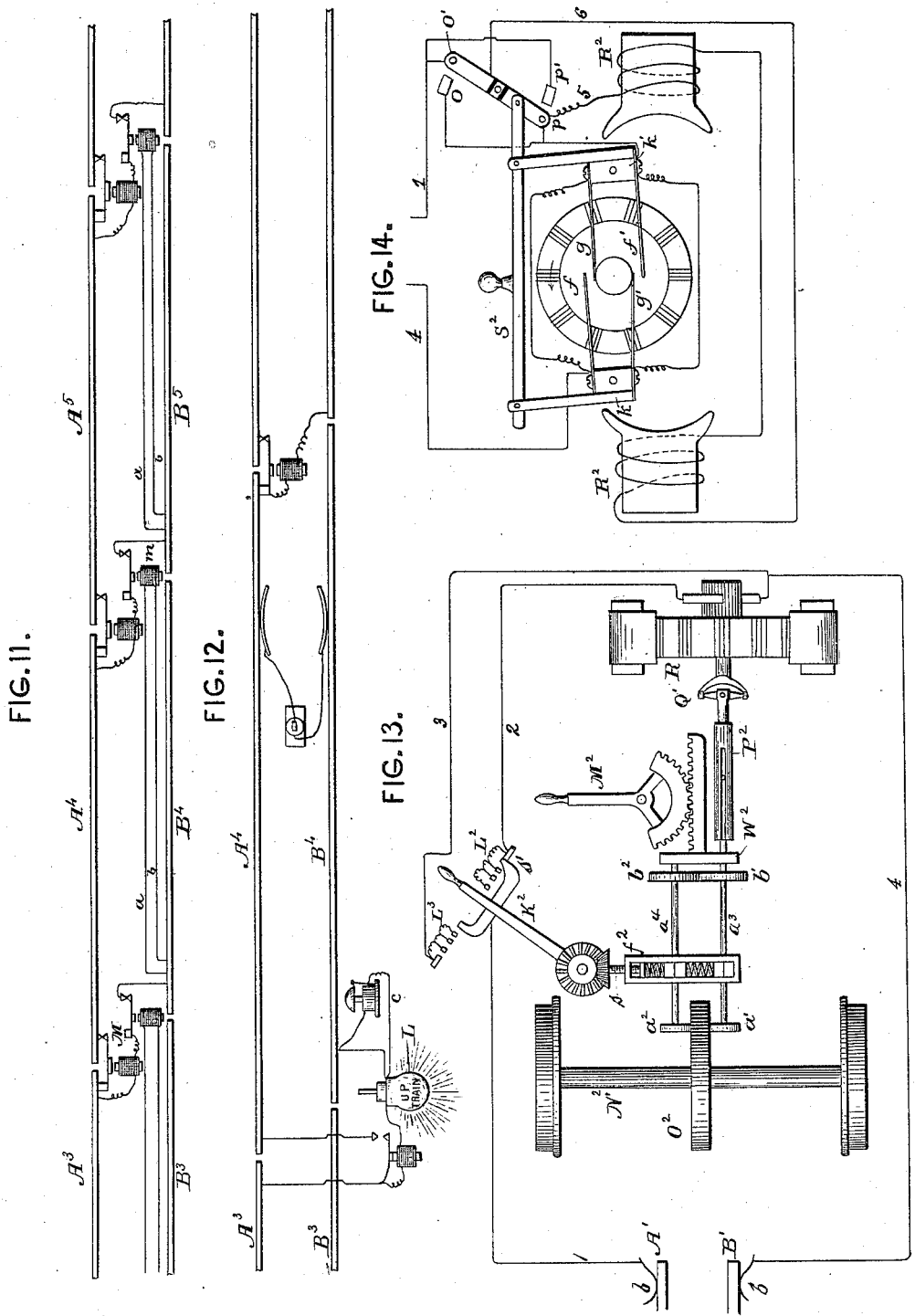

(No Model.)  4 Sheets—Sheet 4.

E. M. BENTLEY.
ELECTRIC RAILWAY.

No. 306,315.  Patented Oct. 7, 1884.

ATTEST.
J. Henry Kaiser.
Geo. T. Smallwood.

INVENTOR.
Edward M. Bentley

UNITED STATES PATENT OFFICE.

EDWARD M. BENTLEY, OF BROOKLYN, NEW YORK.

ELECTRIC RAILWAY.

SPECIFICATION forming part of Letters Patent No. 306,315, dated October 7, 1884.

Application filed December 29, 1883. (No model.)

*To all whom it may concern:*

Be it known that I, EDWARD M. BENTLEY, a citizen of the United States, residing at Brooklyn, New York, have invented certain new and useful Improvements in Electric Railways, of which the following is a specification.

My invention consists in an arrangement whereby a number of electric locomotives may be run in series, and in details of construction and operation of the road, motors, and connections.

Figure 16:
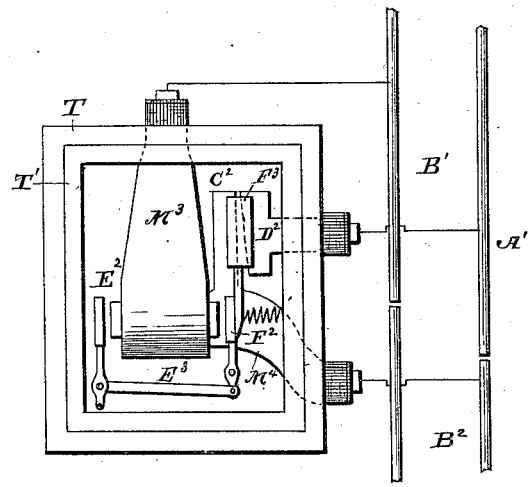
Figure 17:
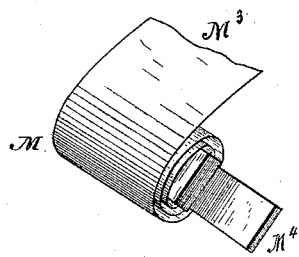

In the accompanying drawings, Figure 1 shows my series arrangement. Figs. 2 and 3 show an arrangement of branch tracks. Fig. 4 is a section of the road-bed, conduit, and conductors. Figs. 5, 6, 7, 8, 9, and 10 show the details of construction of the conduit and means of maintaining electrical connection with the conductors, Fig. 7 being a section on line 5 5, Fig. 5. Fig. 11 shows a block system; Fig. 12, a way of signaling a coming train. Fig. 13 shows the way of making mechanical connection between motor and driving-wheels and electrical connection through the motor. Fig. 14 shows the method of reversing the motor. Figs. 16 and 17 show details of switch-box, and Fig. 18 a form of conduit-slot.

In Fig. 1, C and D are the ordinary supporting-rails of a railroad. Between them are laid, preferably in a protecting-conduit, as shown in Fig. 4, two conductors, $A'$ $A^2$ $A^3$, &c., and $B'$ $B^2$ $B^3$, &c. These conductors are divided into insulated sections of any desired length, and each section of one conductor is connected at one end with the succeeding opposite section of the other conductor, as $A^2$ and $B^3$, $A^3$ and $B^4$, &c. In each one of these cross-connections is placed an electro-magnet, M, which, when energized, acts to operate an electric switch, and thereby to break a normally-closed connection between the successive sections of one conductor, which conductor is connected at one end to the generator, and at the other end to the ground or return conductor, which may be an aerial conductor on poles, as in Fig. 1. The magnets M are preferably wound with a very few turns of coarse wire in the line-circuit; but a branch-circuit magnet may be used.

Any locomotive traveling on rails C and D has depending from it two contact brushes or rollers, $b$ $b$, which are connected, respectively, to the two terminals of the motor, and have a sliding connection with the two conductors A and B, respectively. Suppose such a locomotive is on any section, as $A^4$ $B^4$, and proceeding in the direction of the arrow. If the connection between $A^3$ and $A^4$ is unbroken, a branch of the current from source G, lines $A^5$ $A^4$ $A^3$, &c., will pass from $A^4$, through motor to $B^4$, and through magnet M to $A^3$, thereby energizing M, and breaking the connection from $A^4$ to $A^3$, and causing the whole current to pass from $A^4$, through motor to $B^4$, magnet M $A^3$, and on. This branch current will be greater if the motor is placed in short circuit. When the motor reaches the end of the section, the lower brush, $b$, moves first from $B^4$ to $B^3$, thereby disenergizing magnet M, and closing contact between $A^3$ and $A^4$, and at the same time energizing a succeeding magnet, $M'$, and breaking contact between $A^2$ and $A^3$; then the upper brush moves from $A^4$ to $A^3$, and the current passes from $A^3$, through motor to $B^3$, magnet $M'$ $A^2$, and on. The arrangement as shown is such that the lower brush makes contact with $B^3$ before the upper brush makes contact with $A^3$, though they may both make contact simultaneously, but with danger of sparking and short-circuiting. To prevent still further the danger of sparking, I make the ends of two insulated sections to overlap, as shown in Fig. 10, whereby the brush will be sure to make contact with one before breaking contact with the other. If by accident or otherwise the circuit of any motor is broken, all the active switch-magnets will release their armatures and short-circuit the motors. In all but the faulty motor this short circuit is instantly broken automatically, or by throwing the motors on short circuit, the switch-magnets being thus re-energized, while the faulty motor remains out of circuit. It will be seen that if the train is moving in the opposite direction the magnet B will be energized as long as the lower brush is in contact with $B^4$ and keep the switch open. When it moves on to $B^5$, M is demagnetized and the next switch opened. The train can therefore move with equal facility in either direction, the switch ahead of it being always open in the one case, and the switch behind it open in the other. It will also be seen that any train is completely independent of any other which is not on the same section, and that when two or more trains get onto the same section they will be in multiple arc with each other, as shown on section A' B', Fig. 1, and each will therefore receive but half the current it otherwise would have. This will serve as a block for all practical purposes, as an engineer will at once be warned that he is on the same section with another locomotive and his train will automatically slow up, receiving as it does but half the current. He can then go ahead slowly or break the circuit through his motor and allow the other train to get off the section with its full power. A complete block is made by the system shown in Fig. 11. Each section of conductor B B',&c., has at its end a branch circuit, $a\ a$, extending back and controlling the previous cross-circuit. If, therefore, a train was on section $A^4 B^4$, a branch current will pass by wires $a\ a$ back through magnet M, which will hold broken the cross-circuit from $B^5$ to $A^4$. No train can then come onto the section $A^5 B^5$ without being short-circuited until the previous train is off section $A^4 B^4$, and the cross-circuit from $B^5$ to $A^4$ restored. The cross-circuit between opposite sections may also include a signaling device to give notice of an approaching train. In Fig. 12, such a signaling device is an arc lamp, L. It may be placed at a station or crossing, and when a coming train strikes the section $A^4 B^4$ at any predetermined distance away the lamp is thrown in and burns until the train passes.

A bell, $c$, or any other signaling or indicating device may be operated.

An arrangement for side tracks is shown in Figs. 2 and 3.

In Fig. 2 the branch is a comparatively short one, intended for a single locomotive, or for two or more in multiple arc. In Fig. 3 the branch is of any length required, and the locomotives thereon are in series as on the main line.

In Fig. 2 the branch conductors A' B' are permanently connected to the main lines A and B, respectively. Sections of the main lines A and B are movable, and, as in an ordinary railroad-switch, can be directed toward the branch or the main-line conductors. The conductors are severed like the ordinary rails, so as to permit the brushes to pass, and all the brakes in the circuit are bridged electrically by flexible wires or sliding contacts. When a motor is running on the branch the switch may be turned back and the circuit will be from A to A', through motor to B', to B, and on through the switch-magnet in the usual way. If, now, a main-line train runs onto the section A B, it will be in multiple arc with the train on the branch; but as the section can be made very short it will not retard either train appreciably. For the usual purposes of such a branch, however, one or more trains will be run onto it and left standing with the circuit broken through their motors. They will not then interfere at all with the main-line trains. When, however, two branch roads are to be supplied from the same source, the arrangement in Fig. 3 will be necessary. The switching section and the severed conductors will be the same as in Fig. 2; but as it will be the end of a main-line section the branch conductors will not be connected to the main, but the section A' B' of the branch will bear the same relation to sections A B as is borne by the main-line sections $A^2$ and $B^2$. The branch has its return-conductor brought back and connected to the section $A^2$. The usual connection between A and $A^2$ is omitted, and is made between A and A' instead. When the situation is as shown in Fig. 3, and a train comes onto section A B, the contact D will be broken by magnet M, and the circuit will be from A, through motor to B, by cross-connection and magnet M to A', through motors and line of the branch back by C to $A^2$, and on in the usual way. When the train reaches section $A^2 B^2$, the contact at D is closed and the next switch operated; the circuit is then from A, through contact D, to A', to C, to $A^2$, to motor, to $B^2$, to switch-magnet, and on as before. When the railway-switch is turned, the train runs off from A B onto A' B', in the same manner that it went from A B onto $A^2 B^2$. All the trains on the branch are constantly in series with those on the main.

Having described the main electrical parts, I will now describe the mechanical construction of the road and locomotive.

Fig. 4 is the cross-section of the road as applied to ordinary street-surface traffic.

W W' are the supporting-rails, which are spiked to stringers resting on ties U, in the ordinary way.

In the center of the track is a wooden conduit, preferably made in two halves, K K', firmly bolted together, so as to resist the inward thrust from the surrounding earth. The wood itself is creosoted and soaked in paraffine or petroleum residuum and laid in a bed of asphalt, X, which rests on ties U. The slot at the top may be very narrow—as, for instance, one-half or three-fourths inch—and the wood capped with iron plates E F, as shown in Fig. 18.

As a very high electro-motive force is essential in a series system, it is necessary that moisture should be excluded as completely as possible and the insulation preserved. To effect this I place the slot of the conduit at the highest point in the center of the track, with a water-shed toward the sides. The only water that can then enter will be that falling directly down into slot T. To exclude even this I make the iron plates E and F, which are in short lengths, come together in the center and form an arch, as shown in Fig. 4. The plates are then hinged at their outer edges, as seen in Fig. 6, and a two-ended plow, H, is provided, which depends from the moving locomotive, and lifts up the plates in succession as it passes, and gradually lowers them into position again as it moves away. I also make the floor of the conduit gradually become lower at intervals, while the conductors remain at the same horizontal level with respect to brushes $b\,b$. (See Fig. 8.) At the lowest points a sewer-connection or drain-pipe, N, is placed, with a downwardly-opening valve. The conductors A B are placed on opposite sides of the conduits, and supported at intervals by projecting pins $d\,d$.

In order to allow for the longitudinal expansion and contraction of the conductors without having them come in contact at their ends, I make the ends independent pieces, $z\,z$, as shown in Fig. 9, which are in electrical contact with the main parts and overlap them, so as to allow the main parts to expand and contract without moving end pieces, $z\,z$. The same effect will be attained by the overlapping arrangement shown in Fig. 10. The two ends of plow H are joined by a ring, P, and also by an arch, $P^3$, which is hung on the car-axle $N^2$ by a loose box, which has a projection, $q$, extending upward through a guide-piece, $p^2$, depending from the bottom of the car, so as to have free vertical play therein. By this arrangement a steadier movement, free from vertical displacement, is given to the brushes $b\,b$ on the conductors A B. Both ends of plow H have a horizontal ridge, $r$, on which plates E and F ride as the plow passes along. This prevents any wear of the plate which will affect the meeting surfaces of E and F. The interior of the plow is filled up with insulating material, $D^3$, in which are embedded the vertical rods O O′, having at their lower ends the brushes $b\,b$, respectively.

O O′ have freedom of axial rotation, and there are springs S S, which impart to O O′ a rotative tendency, which presses the brushes $b\,b$ against the conductors A B. At their upper ends rods O O′ are connected, respectively, to leading conductors $t\,t'$.

In Fig. 13, R is the motor, whose shaft is connected by a gimbal-joint, Q′, with a slotted hollow shaft, $P^2$, in which slides a shaft, $a^3$, having a pin projecting into the slot of $P^2$, so as to be turned with it.

On shaft $a^3$ are two friction-wheels, $a'$ and $b'$, the former bearing against the face of friction-disk $O^2$ on shaft $N^2$, and the latter giving motion to wheel $b^2$ on shaft $a^4$, which carries a friction-wheel, $a^2$, bearing against the opposite side of $O^2$ from $a'$. The shafts $a^3\,a^4$ run in spring-boxes, which slide in frame $f^2$, which has itself a slight longitudinal movement, and are pressed together by screw $s$, turned by a bevel-wheel on end of lever $K^2$. Any movement of the lever in either direction turns the bevel-gear-wheel, which is on the same axis, which wheel meshes with a corresponding beveled pinion on the head of the screw $s$. The screw presses against the sliding boxes of shafts $a^3$ and $a^4$, and forces them in closer proximity, or withdraws and allows them to recede from each other under the pressure of the intervening springs. Shafts $a^3$ and $a^4$ and their friction-wheels are moved longitudinally by toothed sector $M^2$, working a rack-bar, the shaft $a^3$ sliding in hollow shaft $P^2$. By this means the radial distance of the wheels $a'\,a^2$ on disk $O^2$ can be varied at will, and the power and speed of the motor varied correspondingly.

On lever $K^2$ is a contact-piece, $s'$, adapted in its movement to connect with the successive plates of resistance-coils $L^2\,L^3$. $s'$ is connected by line 1 with one of the sliding brushes $b$, while resistance-coil $L^3$ is connected by lines 3 and 4 directly to the other brush, so as to form a short circuit around the motor. $L^2$ is connected by line 2 to one commutator-brush of the motor, the other brush being connected by line 4 to the opposite sliding brush, $b$. In the position shown there is no resistance in line 2, and the whole current is passing through the motor, while there is an infinite resistance in the short-circuit line 3. The friction-wheels $a'\,a^2$ are now in contact with $O^2$, and any further movement of $K^2$ to the right increases the frictional pressure of $a'$ and $a^2$ on $O^2$ without affecting the circuit. A movement of $K^2$ to the left, however, relieves the friction, and at the same time cuts out resistance from line 3 and cuts in resistance in line 2. Thus motor R is gradually cut out and the short circuit cut in. By the reverse movement of $K^2$ the motor is gradually cut in and obtains a degree of momentum before the friction-wheels $a'$ and $a^2$ are brought down against $O^2$.

For reversing the motor a third device is used, as shown in Fig. 14. This device simultaneously reverses the current through the field-magnets and applies a new set of brushes to the commutator.

$S^2$ is a bar joining the upper ends of levers $k\,k'$, carrying insulated brushes $f\,g'$ and $g\,f'$, respectively. When in the position shown, $k\,k'$ are so turned that brushes $g\,g'$ are resting on the commutator, and the armature is adapted to rotate in the direction of the arrow. When $S^2$ is moved to the right, $k\,k'$ turn on their pivots, and brushes $f\,f'$ come in contact with the commutator. In a series system it is desirable that the main line should remain unbroken, and therefore the motor should be short-circuited before being reversed, or the brushes arranged so that one pair makes contact before the other breaks contact. $S^2$ also operates a pivoted switch, having its two ends insulated from each other and connected, respectively, to lines 5 and 6, leading to the field-magnets.

In one position the switch makes contact with points $p$ and $o'$, and in the other position with points $p'$ and $o$, $o'$ and $p'$ being connected to line 1 and $o$ and $p$ to line 4 through the armature. In the first position the circuit is from 1 to $o'$, to line 6, and through the field-magnet in a certain direction, and by line 5 to $p$, brush $g$, armature, brush $g'$, to line 4. In the second position of the switch the circuit would be from 1 to $p'$, line 5, and through the field-magnet in the opposite direction to line 6, point $o$, and through the armature, as before, to line 4. Thus the direction of current in the armature remains constant, while that in the field is reversed by the movement of the switch which is placed between the armature and field.

The switching-magnets at the end of the section may be arranged in practice as shown in Figs. 16 and 17. The magnet for carrying the heavy current required may be made by winding on a core an insulated copper ribbon, $M^3$, equal in width to the length of the core, and having a strip, $M^4$, at its inner end projecting at right angles to the ribbon, so as to allow of electrical connection therewith. This magnet and the contacts controlled thereby are placed in a box, $T'$, of porous terra-cotta, which will receive fastening screws or nails, and which is also non-combustible and non-carbonizable, so that it will not be injured by any sparking, and this box is inclosed in a protecting-box of wood or other suitable material. Two armatures are arranged at opposite ends of M, and so connected by link $E^3$ as to co-operate in moving contact-piece $F^3$ from plate $D^2$ to plate $C^2$, when the magnet becomes energized. $C^2$ is a projection from plate $M^4$, and the circuit will normally be from rail $A'$ to plate $D^2$, piece $F^3$, plate $C^2$, plate $M^4$, and to rail $B^2$. When the magnet becomes energized by the coming train, $F^3$ breaks contact with $D^2$, and the whole current passes by rail $B'$, magnet M, plate $M^4$, to rail $B^2$. These boxes are placed at intervals along the track beside the main conduit, and are accessible from the surface, so as to allow of inspection and repairs, and to give an indication of the ends of the sections.

Figure 15:
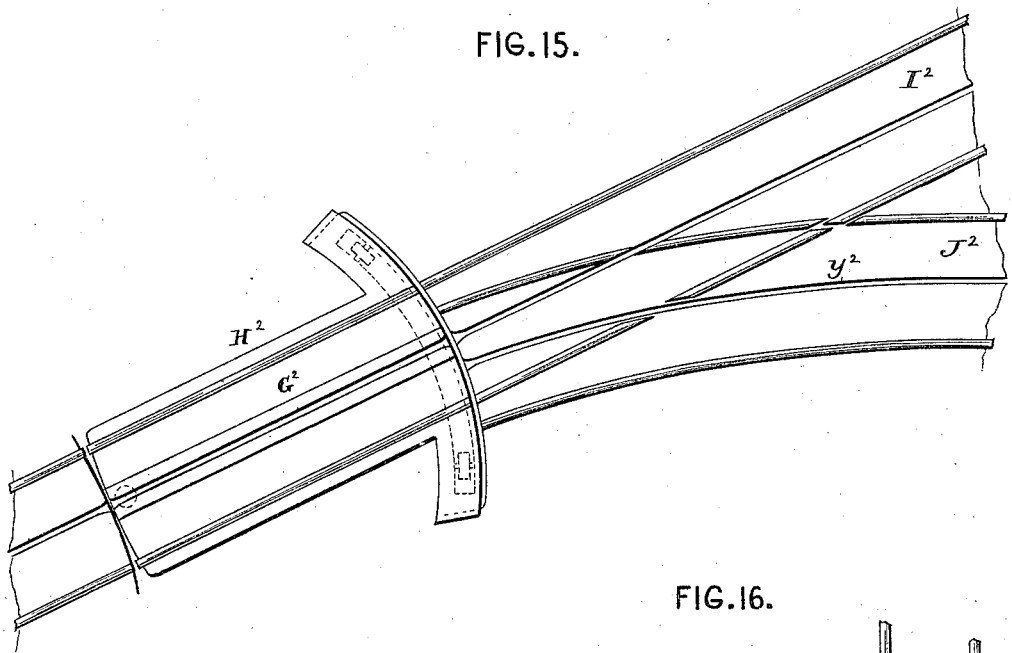

Fig. 15 shows the construction of a railway-switch for the electric road having extra conducting rail or rails for the current. $H^2$ is a swinging platform, carrying the movable section of the main track, including the conduit for the conductor. The platform moves from one side to the other on rollers a sufficient distance to bring the rails of the movable section in line with one set of branching rails and the conduit, and its inclosed conductors in line with conduit of the corresponding branch track. The slots of the conduit-sections are made flaring at their ends, to prevent any catching of the depending conductor as the locomotive moves over the junction. Electrical connection is maintained by flexible conductors in the usual way.

I do not claim in this case the combination, with the conducting-rails of an electric railway, of an electric signaling device operated by the propelling current of the railway, and means for including said device in the circuit of the rails by the action of a distant train.

I do not in this case make the following claims, the same being in case bearing Serial No. 136,971, filed July 2, 1884, and pending herewith, of which this is a division:

"The combination of a vehicle, a propelling electric motor therefor in series with other motors on the same road, bared conductors adapted for conveying the main current extending along the said road, a constant connection between said conductors and the motors, and electrically-operated switches for shunting the main current through said motors.

"The combination of a vehicle, a propelling electric motor therefor in series with other motors on the same road, bared conductors adapted for conveying the main current extending along said road, and switches operated electrically for shunting the main current through said motor, and means for preserving the continuity of the main line during the operation of said switches.

"The combination of a vehicle, a propelling motor in series with other motors on the same road, bared conductors extending along said road and adapted for carrying the main current, electric switches operated from a distance for directing the course of the main current over said conductors, and electrical devices for operating said switches controlled by the current which passes over said conductors between said motor and the adjacent switch.

"The combination of two conductors parallel with the line of an electric railway, electric locomotives in electrical connection with said conductors, said conductors being divided into insulated sections, each section of one conductor being connected with the opposite succeeding section of the other conductor, and cross connections containing electrical devices controlling a connection between successive sections of the other conductor.

"The combination of two or more electric motors in series, a vehicle supporting each motor and propelled thereby, a sectional electric conducting-path extending along the line of progress of said vehicles, conductors extending from each motor and making continuous connection with said conducting-path, the main current normally passing through the motors in succession, and an automatic circuit-closer for each motor acting to preserve the continuity of the main line in the case of rupture of any motor-circuit.

"The combination, in an electric railway, of two conductors extending along the line of the road and divided into sections longer than the ordinary locomotives or trains on the road, electric locomotives having their motor-terminals constantly in connection with the two conductors, respectively, and switches operated by the progress of the train or locomotive for sending the main current through the motors in succession.

"The combination of sectional conductors extending along an electric railway, two opposite conductors in succeeding sections being connected as described, electric locomotives in circuit between opposite sections and in series with one another, and an electric switch at the end of each section for breaking connection between two successive sections.

"The combination of two sectional conductors extending along an electric railway, electric locomotives in series making connection therewith, and an electric switch at the end of each section for controlling the connection between successive sections of one conductor."

What I claim as my invention is—

1. The combination of a railway having means of electric conduction extending along it, and electric locomotives in electrical connection with said means and in series with one another, and a branch railway having an electric conductor branching from the main conductor, and having one or more electric locomotives in electrical connection with said branch conductor and in series with those on the main line.

2. The combination of a railway having means of electrical conduction extending along it, and electric locomotives in connection with said means and in series with one another, and a branch railway having a branch conductor, and two or more electric locomotives in connection with said branch conductor and in series with one another and with those on the main line.

3. The combination of two or more electric motors in series, a vehicle supporting each motor and propelled thereby, a sectional electric conducting-path extending along the line of progress of said vehicle, means for diverting the main current through said motors in succession, and means for controlling the progress of said vehicle, consisting of a switch or commutator carried by each vehicle for removing its propelling-motor from the circuit at will without interruption of the main line.

4. The combination of an electric locomotive in series with others on the same line, supporting-rails therefor, a conduit parallel with said rails and having a longitudinal slot, bared conductors in said conduit insulated from each other and from the neighboring rails and ground, the current in said conductors being in the same direction, and electrical connection between said conductors and the locomotives.

5. The combination, in an electric railway, of a number of locomotives in series, a generator of electricity of high electro-motive force, a conduit having a longitudinal slot and made of insulating material, and a bared conductor therein carrying a current in one direction, and means for making electrical connection between said conductor and the locomotives.

6. The combination, with the axle of an electric locomotive, of a bare horizontal conductor extending along the line of progress of said locomotive, and an electrical conductor depending from said axle and making contact with said conductor.

7. The combination of a conduit having a longitudinal slot and a bare conductor on its wall, and a conducting-rod entering said slot and having a contact-brush at its lower end, and a spring giving a rotary tendency to said rod, so as to press the brush against the bare conductor.

8. The combination of a frame depending from the axle of an electric locomotive, and maintained vertical, and electrical conductors supported by said frame and in contact with a horizontal conductor.

9. The combination of the conducting-rails of an electrical railway, said rails being divided into sections insulated from one another and longer than the train or locomotive passing over them, electric locomotives in contact with said rails and in series with one another, and means for temporarily blocking a following train until the leading train has left its section.

10. The combination of the conducting-rails of an electric railway, an electric signal-lamp adapted to be operated by the propelling-current of the railway, and a circuit-controller situated at a distance and operated by a distant train for including said lamp in the circuit of the rails.

11. The combination of a motor, line-conductors, a pole-changer controlling the direction of current in the field-magnets, and two sets of brushes having the same line-connections and bearing on the commutator-plates from opposite directions, with means for actuating said pole-changer and shifting said brushes.

12. The combination of a railway-track provided with a slotted conduit containing an electric conductor, and means for making electric connection between said conductor and electric locomotives on said road, and two tracks branching therefrom, also provided with slotted conduits and conductors therein, and means, consisting of movable tracks and conductors, for switching an electric locomotive from the main track onto either of the branch tracks.

13. The combination of an electric railway having supporting-rails and a conducting-rail parallel therewith, a branch railway having also supporting and conducting rails, an electric locomotive making contact with said conducting-rail, and means, consisting of movable tracks and conductors, for switching the locomotive from the main to the branch track while maintaining the electric connections.

14. The combination of an electric switch for making and breaking an electric circuit and a supporting-base of porous terra-cotta.

15. The combination of an electric switch for making and breaking an electric circuit and an inclosing-case of porous terra-cotta.

16. The combination of an inclosed sectional electric conducting-path extending along the line of an electric railway, electric locomotives in series making connection with said conducting-path, means for arresting at will the progress of any one of said locomotives, and external devices for indicating the termination of the sections, whereby a locomotive can be stopped before entering in a section, if desired.

17. The combination of a sectional electric conducting-path extending along the line of an electric railway, electric locomotives in series making connection with said conducting-path, electric switches for controlling the course of the current over said path, and inclosing-boxes for said switches placed beside the line of the conductors.

18. The combination of a slotted conduit extending along the line of an electric railway, sectional electrical conductors therein, electric switches controlling the course of the main current over said conductors, inclosing-cases for said switches placed at intervals along the said conduit, and conductors connecting the switch mechanism and the main conductors.

19. The combination of an underground conduit, sectional electrical conductors therein, and electric switches controlling the course of the current over said conductors, and inclosing-cases for said switches reaching to the surface of the ground.

20. The combination of an electric railway having a sectional electric conductor extending parallel therewith, two or more electric locomotives in serial connection with said conductor on said railway, and means for controlling the progress of any locomotive at will, consisting of a switch for closing at will a short circuit around any one of said locomotives.

21. The combination of two or more railway-vehicles, propelling electric motors therefor in series with one another, an inclosed insulated sectional electrical conducting-path extending along the line of progress of said vehicles, supporting-rails insulated from the conducting-path, conductors connected to the motor-terminals on each vehicle, insulated from the wheels of the vehicle and extending into the inclosure to make contact with the conducting-path, means for diverting the main current through the motors in succession, and means on each vehicle for controlling its progress, consisting of an electric switch for removing any motor from circuit at will without interrupting the continuity of the main line.

EDWARD M. BENTLEY.

Witnesses:
GEO. S. WHEELOCK,
V. A. LEWIS.